US012768771B2

(12) United States Patent
Cho et al.

(10) Patent No.: US 12,768,771 B2
(45) Date of Patent: Oct. 20, 2026

(54) APPARATUS AND METHOD FOR SEMICONDUCTOR OXIDE FILM ELLIPSOMETRIC AMPLITUDE SENSOR

(71) Applicant: KOREA RESEARCH INSTITUTE OF STANDARDS AND SCIENCE, Daejeon-si (KR)

(72) Inventors: Hyun Mo Cho, Daejeon-si (KR); Dong Hyung Kim, Cheonan-si (KR); Wook Choi, Daejeon-si (KR)

(73) Assignee: KOREA RESEARCH INSTITUTE OF STANDARDS AND SCIENCE, Daejeon-si (KR)

( * ) Notice: Subject to any disclaimer, the term of this patent is extended or adjusted under 35 U.S.C. 154(b) by 207 days.

(21) Appl. No.: 18/851,709

(22) PCT Filed: Sep. 20, 2023

(86) PCT No.: PCT/KR2023/014224
§ 371 (c)(1),
(2) Date: Sep. 27, 2024

(87) PCT Pub. No.: WO2024/147429
PCT Pub. Date: Jul. 11, 2024

(65) Prior Publication Data
US 2026/0243660 A1 Aug. 20, 2026

(30) Foreign Application Priority Data
Jan. 5, 2023 (KR) ........................ 10-2023-0001660

(51) Int. Cl.
*G01N 21/21* (2006.01)
*G01B 11/06* (2006.01)

(52) U.S. Cl.
CPC ........ *G01N 21/211* (2013.01); *G01B 11/0616* (2013.01)

(58) Field of Classification Search
CPC . G01B 11/06; G01B 11/0616; G01B 11/0641; G01B 11/065; G01N 21/211;
(Continued)

(56) References Cited

U.S. PATENT DOCUMENTS 4,908,508 A * 3/1990 Dubbeldam ......... G01N 21/211 356/369
5,164,589 A * 11/1992 Sjodin .................. G01N 21/648 250/227.24
(Continued)

FOREIGN PATENT DOCUMENTS

JP 09-166543 6/1997
JP 2017-133867 8/2017
(Continued)

*Primary Examiner* — Gordon J Stock, Jr.
(74) *Attorney, Agent, or Firm* — PnK IP LLC

(57) ABSTRACT

An elliptical amplitude sensor device including a semiconductor oxide film, a micro-channel structure including a support, a dielectric thin film formed on a substrate formed on the support, a cover unit having an incidence window and a reflection window on one side and the other side, respectively, and provided on the support, and a micro-channel formed by combination of the cover unit and the support; a sample injection unit on the dielectric thin film, an adsorption layer for the sample; a polarization generation unit which irradiates polarized incident light through the incidence window onto the adsorption layer at an incident angle θ that satisfies p-wave or s-wave anti-reflection conditions; and a polarization detection unit which separately measures the p-wave reflectance and s-wave reflectance of reflected light reflected from the adsorption layer and passing through the reflection window to detect an ellipsometric amplitude angle.

15 Claims, 11 Drawing Sheets

(58) Field of Classification Search
CPC ...... G01N 21/213; G01N 21/21; G01N 21/05; G01N 21/8422; G01N 21/0303; G01N 2021/0346
See application file for complete search history.

(56) References Cited

U.S. PATENT DOCUMENTS

| | | | | |
|---|---|---|---|---|
| 8,705,033 | B2 * | 4/2014 | Cho | G01N 21/553 356/369 |
| 8,940,538 | B2 * | 1/2015 | Cho | G01N 21/211 436/95 |
| 10,458,901 | B2 * | 10/2019 | Cho | G01N 21/211 |
| 10,921,241 | B2 * | 2/2021 | Cho | B01L 3/502715 |
| 11,719,624 | B2 * | 8/2023 | Cho | B01L 3/502715 436/528 |
| 12,152,982 | B2 * | 11/2024 | Cho | G01J 1/04 |
| 12,625,064 | B2 * | 5/2026 | Kim | G01N 21/211 |
| 2004/0142482 | A1 * | 7/2004 | Westphal | G01N 21/211 436/164 |
| 2009/0059230 | A1 * | 3/2009 | Hermens | C12Q 1/006 356/369 |
| 2011/0122410 | A1 * | 5/2011 | Wang | G01N 21/21 356/369 |
| 2017/0045397 | A1 * | 2/2017 | Schmidt | G01N 21/211 |
| 2023/0324283 | A1 * | 10/2023 | Zawaideh | G01J 3/447 |

FOREIGN PATENT DOCUMENTS

| | | | |
|---|---|---|---|
| JP | 2020-020748 | 2/2020 | |
| KR | 10-2011-0056720 | 5/2011 | |
| KR | 10-1105328 | 1/2012 | |
| KR | 10-1383652 | 4/2014 | |
| KR | 10-2020-0074022 | 6/2020 | |
| KR | 10-2022-0150512 | 11/2022 | |
| WO | WO-02093145 A1 * | 11/2002 | G01N 21/05 |

* cited by examiner

APPARATUS AND METHOD FOR SEMICONDUCTOR OXIDE FILM ELLIPSOMETRIC AMPLITUDE SENSOR

CROSS REFERENCE TO RELATED APPLICATIONS

This application is a National Stage Entry of International Patent Application No. PCT/KR2023/014224, filed on Sep. 20, 2023, which claims priority from and the benefit of Korean Patent Application No. 10-2023-0001660, filed on Jan. 5, 2023, each of which is hereby incorporated by reference for all purposes as if fully set forth herein.

BACKGROUND

Field

Embodiments of the invention relate generally to an apparatus and method for a semiconductor oxide film ellipsometric amplitude sensor, and more specifically, to an apparatus and method of a semiconductor oxide film ellipsometric amplitude sensor for obtaining a high-sensitivity ellipsometric signal by utilizing a semiconductor oxide film that satisfies p-wave and s-wave non-reflective conditions and measuring only reflectance of p-wave and s-wave without using a rotating analyzer or a polarization modulator that requires a complicated actuator.

Discussion of Background

Reflectometry and ellipsometry are optical analysis techniques that measure the thickness or optical properties of a sample by measuring variation of the reflectance or a polarization state of reflective light reflected from the surface of the sample and analyzing the measurement value.

In general, a reflectometer and an ellipsometer are conventional instruments utilizing these techniques. Such instruments are used to evaluate the thickness and properties of various nanometer-level thin films in the process of manufacturing nano thin films in the semiconductor industry. Further, there are continuous efforts to use the instruments for interface analysis of biomaterials, such as protein, DNA, virus, and new drug substances, by expanding the range of use to the biotechnology.

Conventional reflectometers can evaluate the thickness and properties of nano thin films having a size over several nanometers (nm), but their measurement sensitivity is low in terms of analyzing small molecular biomaterials that require sensitivity of about 1 to 0.001 nanometers, so there is a problem that reliability is deteriorated. In comparison to a reflectometer, an ellipsometer has measurement sensitivity under 0.01 nm and the measurement sensitivity is particularly high under the condition of a large refractive index contrast, such as measurement of the thickness of oxide films having a small refractive index, in comparison to a semiconductor on a semiconductor substrate with a high refractive index.

However, an ellipsometer requires a measurement method having improved sensitivity to analyze even low molecular biomaterials.

In order to improve measurement sensitivity in analysis of biomaterials, a surface plasmon resonance sensor (hereafter, referred to as an 'SPR sensor') that is a mixture of reflectometry and a surface plasmon resonance technique (SPR) are known in the art.

Surface plasmon resonance refers to a phenomenon in which electrons existing on a metal surface are excited and collectively vibrated in the normal direction of the surface due to light waves and light energy is absorbed in this process. An SPR sensor has been known as not only being able to measure the thickness and variation of a refractive index of a nano thin film being in contact with a metal surface using the surface plasmon resonance phenomenon that is sensitive to the polarization characteristic of light, but also being able to measure variation of adsorption concentration of biomaterials in real time in a non-labeling manner that does not use a fluorescent material.

An SPR sensor has a structure in which a material such as glass is coated with a thin metal film of tens of nanometers and a sensor to which a bio-matter can be bonded is formed on the thin metal film, and uses the principle that a resonance angle changes when a sample dissolved in a buffer is bonded to the sensor, in which the resonance angle is obtained by measuring reflectance. When light travels into an SPR sensor, a glass material becomes an incident medium and the light passes through a thin film layer to which a bio-matter is bonded, so, finally, a buffer corresponds to a substrate.

In this structure, similar to variation of a bio-thin film layer due to bonding of a sample to be measured, the refractive index of a buffer corresponding to a substrate material directly influences shift of a resonance angle. Accordingly, it is required to independently measure and correct the refractive index of a buffer in order to measure only pure bonding kinetics.

A method of using a delicate valve device, an air injector, and two or more channels and performing correction using one of the channels as a reference channel, etc. are used to correct variation of the refractive index of a buffer and prevent errors due to diffusion between a sample and the buffer. However, it is generally difficult to distinguish a variation of an SPR angle that results from variation of the refractive index of buffer and a variation of an SRP angle that results from pure adsorption and a dissociation characteristic, which may function as a measurement error factor. As a result, conventional SPR sensors fundamentally has difficulties in measuring adsorption and a dissociation characteristic of materials with a small amount of molecules, such as low molecular materials, due to limitation in measurement methods such as those described above.

In addition, since thin metal layers of precious metals such as gold (Au) and silver (Ag) are used for surface plasmon resonance in conventional SPR sensors, the manufacturing cost of the sensors is high. Further, thin metal films have the problem that the surface roughness of thin metal films is not uniform depending on the manufacturing process, so deviation of a refractive index is large. As such, it is difficult to quantitatively measure biomaterials due to an unstable optical characteristic, and an error due to different sensitivity characteristics of different positions is included in relative comparison with a reference channel.

In order to overcome the defects of SPR sensors, when a bio-matter bonding sensor layer is formed on a substrate material, such as silicon, and the amplitude and phase of light reflected from a substrate material after passing through a buffer under an environment of a solution-immersed fine channel are measured by ellipsometry under a p-polarized wave non-reflective condition, it is possible to obtain a signal of which the measured amplitude is sensitive to the bonding kinetics of bio-matters rather than being sensitive to variation of the refractive index of a buffer. When the bonding characteristic of a bio-matter that is adsorbed to a substrate material under the environment of a solution-immersed fine channel, opposite to SPR measurement, a buffer becomes an incident medium and light that has passed through the bio-matter adsorption layer reflects from the substrate material.

In this measurement condition, an ellipsometric angle Ψ showing a measured amplitude shows variation sensitive only to variation of a bio-thin film and a substrate material without being sensitive to variation of the refractive index of an incident medium that is a buffer. In a substrate having a stable refractive index such as silicon, it is possible to obtain a signal in which an ellipsometric angle Ψ that is sensitive only to variation of a bio-thin film.

When a prism incident structure shown in FIG. 1 is used, an ellipsometric angle Δ indicating a phase shows a signal that is sensitive only to the refractive index of a buffer, so it is possible to simultaneously measure the thickness of a bio-thin film and the refractive index of a buffer.

FIG. 1 is a cross-sectional view showing a bio-matter bonding characteristic measurement sensor according to a prior art (hereafter, referred to as a 'prior art measurement sensor'). (The prior art measurement sensor is a device according to the technology disclosed in Korean Patent No. 10-1383652, and the invention is an invention filed and registered by the applicant(s) of the present invention).

As shown in FIG. 1, a bio-matter bonding characteristic sensor according to the prior art includes a prism 10, a fine channel structure 20, a polarized light generator 30, and a polarized light detector 40. The fine channel structure 20 of the bio-matter bonding characteristic sensor according to the prior art forms an environment of a solution-immersed fine channel 21 by placing an adsorption layer 53 on a substrate 51 or a dielectric thin film 52. In this configuration, when a buffer 60 with a sample 1 of a biomaterial dissolved therein is injected into a fine channel of the fine channel structure 20, the biomaterial is adsorbed to a ligand material 2 formed on the surface of the dielectric thin film 52, whereby an adsorption layer 53 having a predetermined thickness is formed.

Further, polarized incident light generated by the polarized light generator 30 passes through an incident surface 11 of the prism and then travels into the interface between the buffer 60 and the substrate 51 at an angle that causes a p-polarized wave non-reflective condition. In this configuration, reflective light reflected from the substrate 51 includes optical data about the refractive indices of the adsorption layer and the buffer of the sample 1. That is, molecular binding and dissociation kinetics such as adsorption concentration, the thickness or refractive index of the adsorption layer, and the refractive index of the buffer are changed in the process in which the sample 1 is adsorbed to and dissociated from the ligand material 2, and accordingly, the measured ellipsometric angles are changed. Further, the reflective light including optical data is detected by the polarized light detector 40. In this configuration, the polarized light detector 40 measures variation according to the polarization component of the reflective light, that is, ellipsometric angles, thereby being able to find out the molecular binding and dissociation kinetics of the sample and the refractive index of the buffer.

FIGS. 2 to 7 show graphs of variation of ellipsometric angles Ψ and A according to variation of a thin film thickness under a p-wave and s-wave non-reflective condition in an environment in which media are water and air. In this case, the graphs of FIGS. 2 to 7 are graphs obtained (measured or analyzed) using the prior art measurement sensor.

In FIG. 2, the left vertical axis shows an ellipsometric angle Ψ (in degrees) for an amplitude, the right vertical axis shows an ellipsometric angle Δ (in degrees) for a phase, and the horizontal axis shows an incident angle. Further, in FIG. 3, the left vertical axis shows the amount of variation of an ellipsometric angle Ψ for an amplitude, the right vertical axis shows the amount of variation of an ellipsometric angle Δ for a phase, and the horizontal axis shows an incident angle.

In FIG. 4, the left vertical axis shows an ellipsometric angle Ψ (in degrees) for an amplitude, the right vertical axis shows an ellipsometric angle Δ (in degrees) for a phase, and the horizontal axis shows an incident angle. Further, in FIG. 5, the left vertical axis shows the amount of variation of an ellipsometric angle Ψ for an amplitude, the right vertical axis shows the amount of variation of an ellipsometric angle Δ for a phase, and the horizontal axis shows an incident angle.

In FIG. 6, the left vertical axis shows an ellipsometric angle Ψ (in degrees) for an amplitude, the right vertical axis shows an ellipsometric angle Δ (in degrees) for a phase, and the horizontal axis shows an incident angle. Further, in FIG. 7, the left vertical axis shows the amount of variation of an ellipsometric angle Ψ for an amplitude, the right vertical axis shows the amount of variation of an ellipsometric angle Δ for a phase, and the horizontal axis shows an incident angle.

FIGS. 2 and 3 show variation of an ellipsometric angle according to variation of a thin film thickness under a p-wave non-reflective condition measured using the prior art measurement sensor. In detail, FIG. 2 shows variation of Ψ and Δ when the thickness of a $SiO_2$ thin film changes from 3 nm to 6 nm on a silicon substrate under a p-wave non-reflective condition in which a medium is water, and FIG. 3 shows variation of Ψ and Δ relative to a thin film of 3 nm to 6 nm based on a substrate having a thickness of 3 nm.

In FIG. 3, it can be seen that the variation of an ellipsometric amplitude angle Ψ is the largest at a p-wave non-reflective angle and increases in almost uniform increments as the thickness increases in increments of 1 nm, and it can be seen that the variation of an ellipsometric phase angle Δ is the smallest at the p-wave non-reflective angle. That is, it can be seen that, at the p-wave non-reflective angle, signal variation according to a thin film thickness is concentrated on the ellipsometric amplitude angle Ψ measured by an ellipsometer and there is little variation of the ellipsometric phase angle Δ.

FIG. 4 shows variation of Ψ and Δ when the thickness of a $SiO_2$ thin film of changes from 3 nm to 6 nm on a silicon substrate under a p-wave non-reflective condition in which a medium is air, and FIG. 5 shows variation of Ψ and Δ relative to a thin film of 3 nm to 6 nm based on a substrate having a thickness of 5 nm.

In FIG. 5, it can be seen that the variation of an ellipsometric amplitude angle Ψ is the largest at a p-wave non-reflective angle and increases in almost uniform increments as the thickness increases in increments of 1 nm, and it can be seen that the variation of an ellipsometric phase angle Δ is the smallest at the p-wave non-reflective angle. Similar to the cases of FIGS. 2 and 3 in which the medium is water, it can be seen that, at the p-wave non-reflective angle, signal variation according to a thin film thickness is concentrated on the ellipsometric amplitude angle Ψ measured by an ellipsometer and there is little variation of the ellipsometric phase angle Δ.

FIG. 6 shows variation of Ψ and Δ when the thickness of a $SiO_2$ thin film of changes from 98 nm to 95 nm on a silicon substrate under an s-wave non-reflective condition in which a medium is air, and FIG. 7 shows variation of Ψ and Δ relative to a thin film of 98 nm to 95 nm based on a substrate having a thickness of 98 nm.

In FIG. 7, it can be seen that the variation of an ellipsometric amplitude angle Ψ is the largest at an s-wave non-reflective angle and increases in almost uniform increments as the thickness changes in increments of 1 nm, and it can be seen that the variation of an ellipsometric phase angle Δ is the smallest at the s-wave non-reflective angle. Similar to the cases of FIGS. 2 to 5 in which the medium is water, it can be seen that, at the s-wave non-reflective angle, signal variation according to a thin film thickness is concentrated on the ellipsometric amplitude angle Ψ measured by an ellipsometer and there is little variation of the ellipsometric phase angle Δ.

Hereafter, the features and limitations of the prior art measurement sensor are described with reference to FIGS. 8 to 11. An ellipsometer is utilized in order to measure an ellipsometric angle.

FIGS. 8 and 9 are a schematic diagram showing the measurement principle of a rotary ellipsometer according to the related art and relevant graphs.

In detail, FIG. 8 is a schematic diagram showing the measurement principle of a conventionally used rotary ellipsometer including a rotary polarizer 71 or analyzer 72 for reflective light.

In FIG. 9, (a) is a graph when the difference in light intensity of p-wave and s-wave components of light reflected from a sample increases, and (b) is a graph of a signal when light reflected from a sample is close to circular polarization in which p-wave and s-wave components thereof are almost the same in light intensity.

As shown in FIGS. 8 and 9, the linearity of optical signal measurement is very important for measurement uncertainty, so it is possible to obtain the most ideal signal when light reflected from a sample is close to circular polarization in which p-wave and s-wave components thereof are almost the same, and it can be seen that the larger the difference in light intensity of p-wave and s-wave components, the larger the measurement uncertainty. This is because it is difficult to maintain linearity for all analyzers in a signal band of analyzers that perform measurement when the difference between a minimum signal and a maximum signal is large.

A measurement condition in which p-wave and s-wave components are almost the same in light intensity can be obtained theoretically when an ellipsometric amplitude angle Ψ and a polarizer angle are the same, and this problem is solved by adjusting the polarizer angle. For a semiconductor thin film, when a thin film with a thickness of 10 nm to hundreds of nm is measured at an angle that is not p-wave non-reflective angle, the value of an amplitude angle Ψ is sufficiently large, so a sufficiently large angle around 30 degrees is used as a polarizer angle. In a p-wave non-reflective condition, as an angle increases, an error of reflective light due to variation of a polarizer angle is reduced and an almost uniform value is observed when the polarizer angle is over 10 degrees, so it is possible to minimize p-wave and s-wave reflectance measurement errors.

FIG. 10 is a graph when measurement is performed on a sample using the prior art measurement sensor under a p-wave non-reflective condition, and FIG. 11 is a graph when measurement is performed on a sample using the prior art measurement sensor under an s-wave non-reflective condition.

In FIGS. 10 and 11, the left vertical axis shows a reflectance of p-wave, the right vertical axis shows a reflectance of s-wave, and the horizontal axis shows an angle of incidence.

As shown in FIG. 10, the prior art measurement sensor can perform high-sensitivity measurement under a p-wave non-reflective condition, but the value of an amplitude angle Ψ is very small as 1 to 5 degrees and the reflectance of p-wave is very low. However, the reflectance of s-wave is very high at about 80%, so a large measurement error due to the difference of reflectance of p-wave and s-wave may be observed.

As shown in FIG. 11, the reflectance of s-wave is very low and the reflectance of p-wave is very high at about 60% under an s-wave non-reflective condition, so a large measurement error due to the difference of reflectance of p-wave and s-wave may be observed.

If a polarizer angle is fitted to a small polarizer angle that almost corresponds to a p-wave under a p-wave non-reflective condition and the polarizer angle is fitted to an angle around 90 degrees that almost corresponds to an s-wave under an s-wave non-reflective condition to overcome this problem, there may be another problem of a large measurement error from a polarizer angle which may occur even by fine variation such as vibration or optical axis alignment.

In order to obtain both of ellipsometric amplitude angle Ψ and phase angle Δ under p-wave and s-wave non-reflective conditions, it is difficult to avoid the problem that a large measurement error from a polarizer angle which occurs even by fine variation such as vibration or optical axis alignment, as described above.

However, as shown in FIGS. 2 to 7, it can be seen that, under a p-wave or s-wave non-reflective condition, signal variation according to a thin film thickness is concentrated on an ellipsometric amplitude angle Ψ and there is little variation of an ellipsometric phase angle Δ, so only the amplitude angle Ψ is required.

It is possible to effectively obtain information about variation of a thin film thickness only from an ellipsometric amplitude angle Ψ under p-wave and s-wave non-reflective conditions, and thus, according to embodiments of the invention, it is possible to simply obtain the information from the values of p-wave reflectance and s-wave reflectance without a complicated actuator.

Ellipsometric amplitude angle Ψ and phase angle Δ can be obtained from the ratios rp and rs of reflective indices of a p-wave and an s-wave, as in the following equation. It is required to use an ellipsometer that can simultaneously measure the amplitude of a reflective index and phase variations of δp and δs of a p-wave and an s-wave after reflection.

$$\rho = \tan\psi\ \exp(i\Delta) = \frac{r_p}{r_s} = \left|\frac{r_p}{r_s}\right| \exp i(\delta_p - \delta_s)$$

In order to measure also an ellipsometric phase angle Δ in addition to an ellipsometric amplitude angle Ψ, it is required to use a complicated actuator such as for rotating a polarizer, an analyzer, a compensator, etc., or polarization modulation using a piezobirefringence element. For these reasons, it may be difficult to use the actuator as site examination equipment.

However, when measuring only an ellipsometric amplitude angle Ψ, it is possible to simply obtain the ellipsometric amplitude angle from the ratio of Rp and Rs that are reflectance of a p-wave and an s-wave without using a complicated ellipsometer.

$$(\tan\psi)^2 = \left|\frac{r_p}{r_s}\right|^2 = \frac{R_p}{R_s}$$

The above information disclosed in this Background section is only for understanding of the background of the inventive concepts, and, therefore, it may contain information that does not constitute prior art.

SUMMARY

An apparatus and method for a semiconductor oxide film ellipsometric amplitude sensor according to embodiments of the invention is capable of obtaining a high-sensitivity ellipsometric signal by utilizing a semiconductor oxide film that satisfies p-wave and s-wave non-reflective conditions and measuring only reflectance of p-wave and s-wave without using a rotating analyzer or a polarization modulator that requires a complicated actuator.

Additional features of the inventive concepts will be set forth in the description which follows, and in part will be apparent from the description, or may be learned by practice of the inventive concepts.

An apparatus for a semiconductor oxide film ellipsometric amplitude sensor according to an embodiment includes: a fine channel structure including a bed, a dielectric thin film formed on a substrate formed on the bed, a cover having an incident window and a reflective window on one side and the other side, respectively, and installed on the bed, and a fine channel that is a channel formed by combination of the cover and the bed; a sample injector forming an adsorption layer of a sample on the dielectric thin film by injecting a buffer containing a biomaterial sample into the fine channel; a polarized light generator emitting incident light polarized through the incident window to the adsorption layer at an incident angle θ satisfying a p-wave or s-wave non-reflective condition; and a polarized light detector detecting an ellipsometric amplitude angle by measuring reflective light, which has passed through the reflective window after reflecting from the adsorption layer, separately with reflectance of p-wave and s-wave, wherein the polarized light detector includes a polarizing beamsplitter that splits the reflective light into two pieces of polarized light and a light detection unit that obtains predetermined optical data by detecting the respective two pieces of light.

In an embodiment of the present disclosure, the polarized light detector may further include: an operation processor that is electrically connected to the light detection unit and derives measurement values based on the optical data; and a detection compensator that delays the phase of a polarization component of the reflective light.

In an embodiment of the present disclosure, the operation processor may derive the measurement value including an adsorption concentration and adsorption and dissociation constants of the sample by obtaining an amplitude ellipsometric constant Ψ of ellipsometry by measuring only reflectance ratio of p-wave light and s-wave light that are the two pieces of light split from the reflective light.

In an embodiment of the present disclosure, the light detection unit may include: a p-wave detector that detects p-wave light from the two pieces of light; and an s-wave detector that detects s-wave light from the two pieces of light.

In an embodiment of the present disclosure, the polarizing beamsplitter may include: a beamsplitter that splits reflective light into two pieces of light; and a coating layer that is formed on the surface of the beamsplitter by coating and polarizes reflective light.

In an embodiment of the present disclosure, the polarizing beamsplitter may further include a cube formed by putting a combination of the coating layer and the beamsplitter therein.

In an embodiment of the present disclosure, the polarizing beamsplitter may include: a beamsplitter that splits the reflective light into two pieces of light; a first splitting polarizer that is a polarizer polarizing one of the two pieces of light; and a second splitting polarizer that is a polarizer polarizing the other one of the two pieces of light.

In an embodiment of the present disclosure, the polarized light generator may include: a light source that emits predetermined light; an incident polarizer that is a polarizer for producing polarized light; and an incident compensator that delays a phase of a polarization component of the incident light.

In an embodiment of the present disclosure, the polarized light generator may further include: a collimating lens that provides collimated light to the incident polarizer; and a focusing lens the increases of a light quantity of the incident light by converging collimated light that has passed though the polarizer.

In an embodiment of the present disclosure, the incident light generated by the polarized light generator may be a linear-polarized, circular-polarized, elliptical-polarized, or non-polarized light source.

In an embodiment of the present disclosure, the cover has a plurality of separation walls dividing an internal space thereof, whereby a plurality of fine channels may be formed.

In an embodiment of the present disclosure, the fine channel structure may include a plurality of dielectric thin films, and a plurality of different samples may be adsorbed to the plurality of dielectric thin films, respectively A method of using the apparatus for a semiconductor oxide film ellipsometric amplitude sensor according to an embodiment includes: a first step in which the sample injector injects a buffer containing the sample into the fine channel of the fine channel structure; a second step in which the sample flows into the fine channel and is adsorbed to the dielectric thin film, thereby forming the adsorption layer; a third step in which the polarized light generator polarizes predetermined light and sends the polarized light into the adsorption layer at an incident angle satisfying a p-wave or s-wave non-reflective condition through the incident window of the fine channel structure; a fourth step in which reflective light reflecting from the adsorption layer travels into the polarized light detector through the reflective window; and a fifth step in which the polarized light detector measures only a reflectance ratio of the p-wave and the s-wave of the reflective light and operates an amplitude ellipsometric constant of ellipsometry using the reflectance ratio of the p-wave and the s-wave.

An apparatus for a semiconductor oxide film ellipsometric amplitude sensor according to another embodiment includes: a fine channel structure including a bed, a dielectric thin film formed on a substrate formed on the bed, a cover having an incident window and a reflective window on one side and the other side, respectively, and installed on the bed, and a fine channel that is a channel formed by combination of the cover and the bed; a sample injector forming an adsorption layer of a sample on the dielectric thin film by injecting a buffer containing a biomaterial sample into the fine channel; a polarized light generator emitting incident light polarized through the incident window to the adsorption layer at an incident angle θ satisfying a p-wave or s-wave non-reflective condition; and a polarized light detector detecting an ellipsometric amplitude angle by measuring reflective light, which has passed through the reflective window after reflecting from the adsorption layer, separately with reflectance of p-wave and s-wave, wherein a plurality of adsorption layers is formed in one fine channel, the polarized light generator emits a plurality of pieces of incident light to the plurality of adsorption layers, respectively, and the polarized light detector includes a light detection unit that obtains predetermined optical data by detecting, respectively, a plurality of pieces of reflective light from the plurality of pieces of incident light.

An apparatus for a semiconductor oxide film ellipsometric amplitude sensor according to still another embodiment includes: a fine channel structure including a bed, a dielectric thin film formed on a substrate formed on the bed, a cover having an incident window and a reflective window on one side and the other side, respectively, and installed on the bed, and a fine channel that is a channel formed by combination of the cover and the bed; a sample injector forming an adsorption layer of a sample on the dielectric thin film by injecting a buffer containing a biomaterial sample into the fine channel; a polarized light generator emitting incident light polarized through the incident window to the adsorption layer at an incident angle θ satisfying a p-wave or s-wave non-reflective condition; and a polarized light detector detecting an ellipsometric amplitude angle by measuring reflective light, which has passed through the reflective window after reflecting from the adsorption layer, separately with reflectance of p-wave and s-wave, wherein the polarized light detector includes a polarizing beamsplitter that splits the reflective light into two pieces of light and a light detection unit that obtains predetermined optical data by detecting the two pieces of light, and the polarized light generator includes a beam expander that expands an emission area of the incident light.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION

Figure 1:
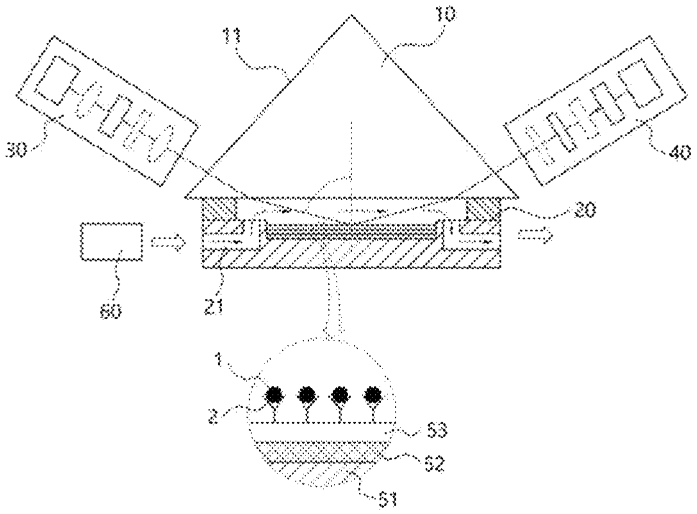
FIG. 1 (PRIOR ART)
FIG. 1 is a cross-sectional view showing a bio-matter bonding characteristic measurement sensor according to a prior patent.
Figure 2:
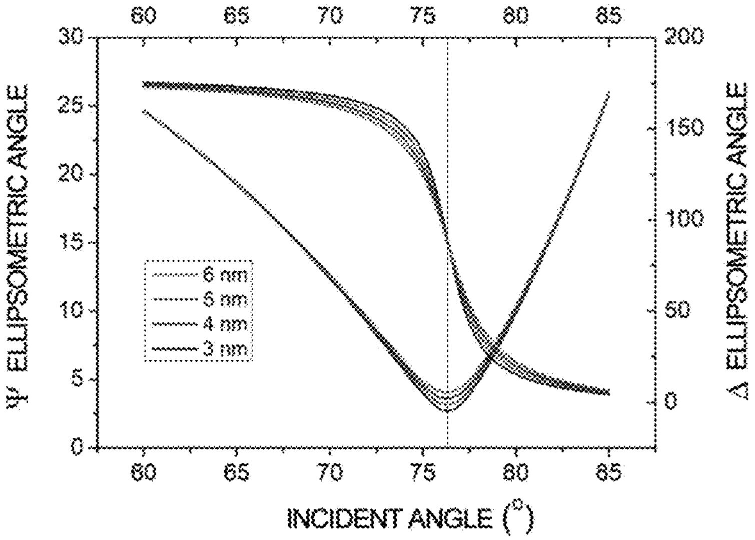
FIG. 2 (PRIOR ART)
FIGS. 2, 3, 4, 5, 6, and 7 are graphs showing variation measurement values of ellipsometric angles Ψ and Δ according to variation of the thickness of a thin film under a p-wave and s-wave non-reflective condition using a prior art measurement sensor in an environment in which media are water and air.
Figure 3:
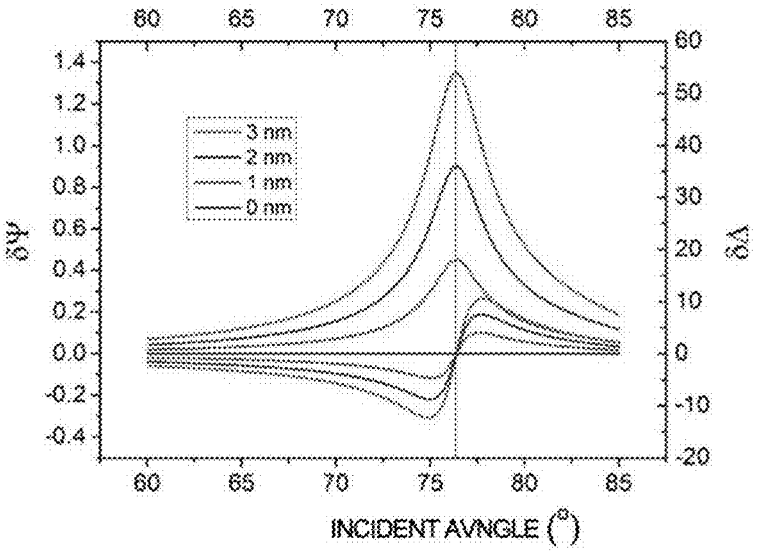
FIG. 3 (PRIOR ART)
Figure 4:
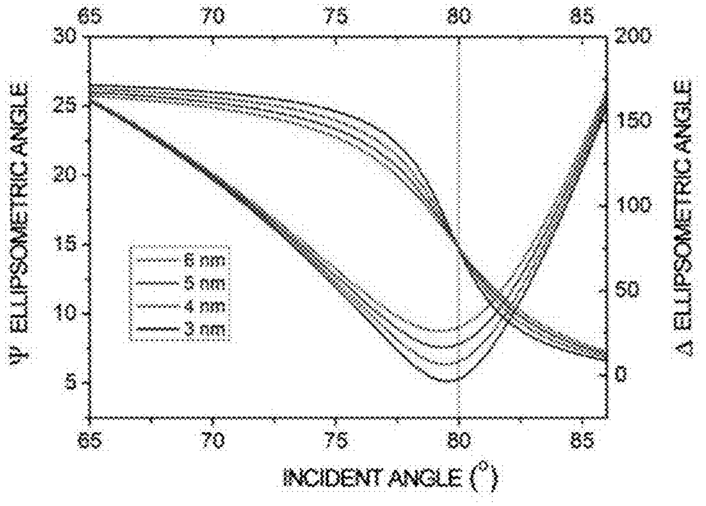
FIG. 4 (PRIOR ART)
Figure 5:
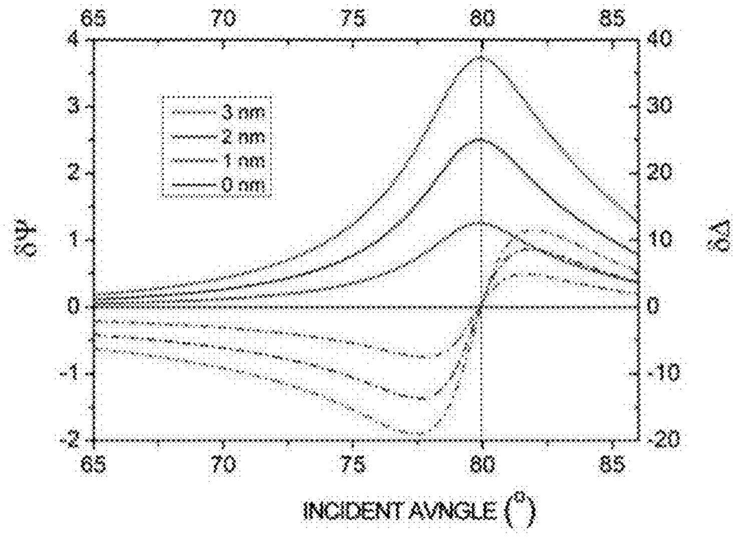
FIG. 5 (PRIOR ART)
Figure 6:
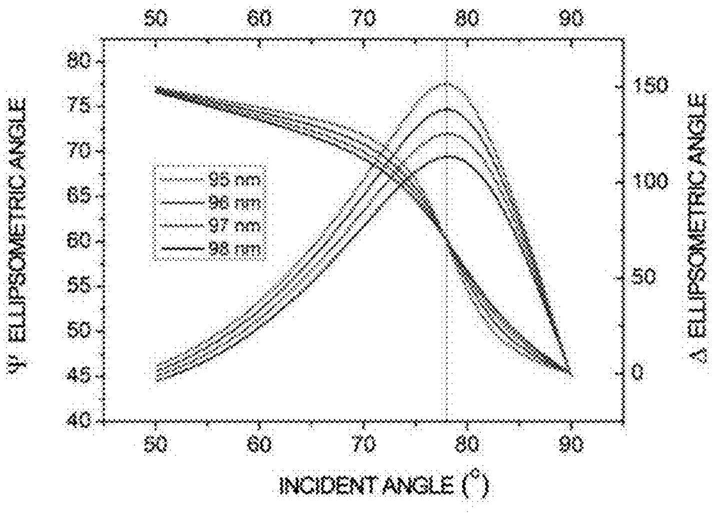
FIG. 6 (PRIOR ART)
Figure 7:
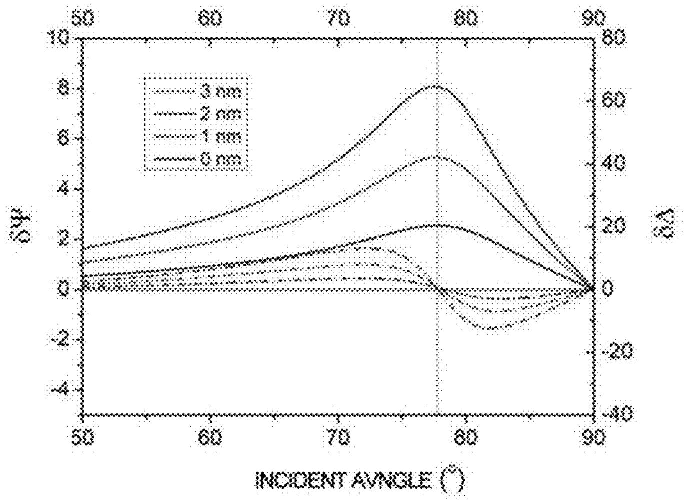
FIG. 7 (PRIOR ART)
Figure 8:
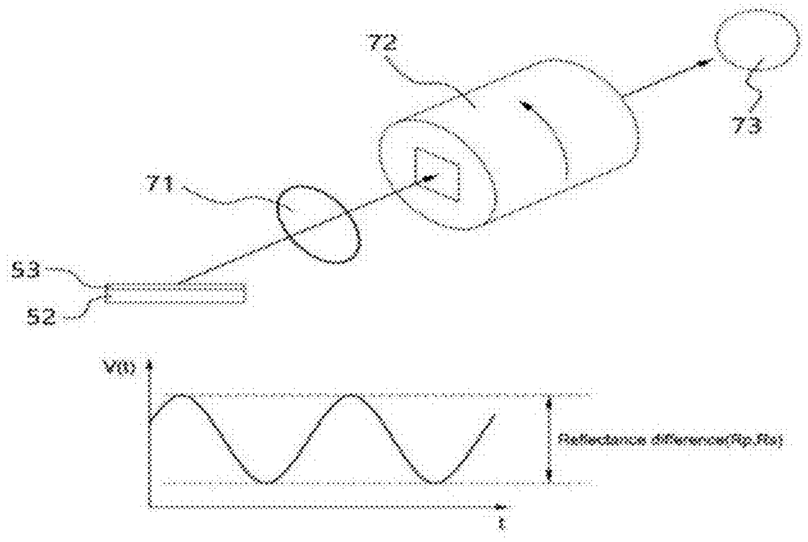
FIG. 8 (PRIOR ART)
FIGS. 8 and 9 are a schematic diagram showing the measurement principle of a rotary-type ellipsometer according to the related art and relevant graphs.
Figure 9:
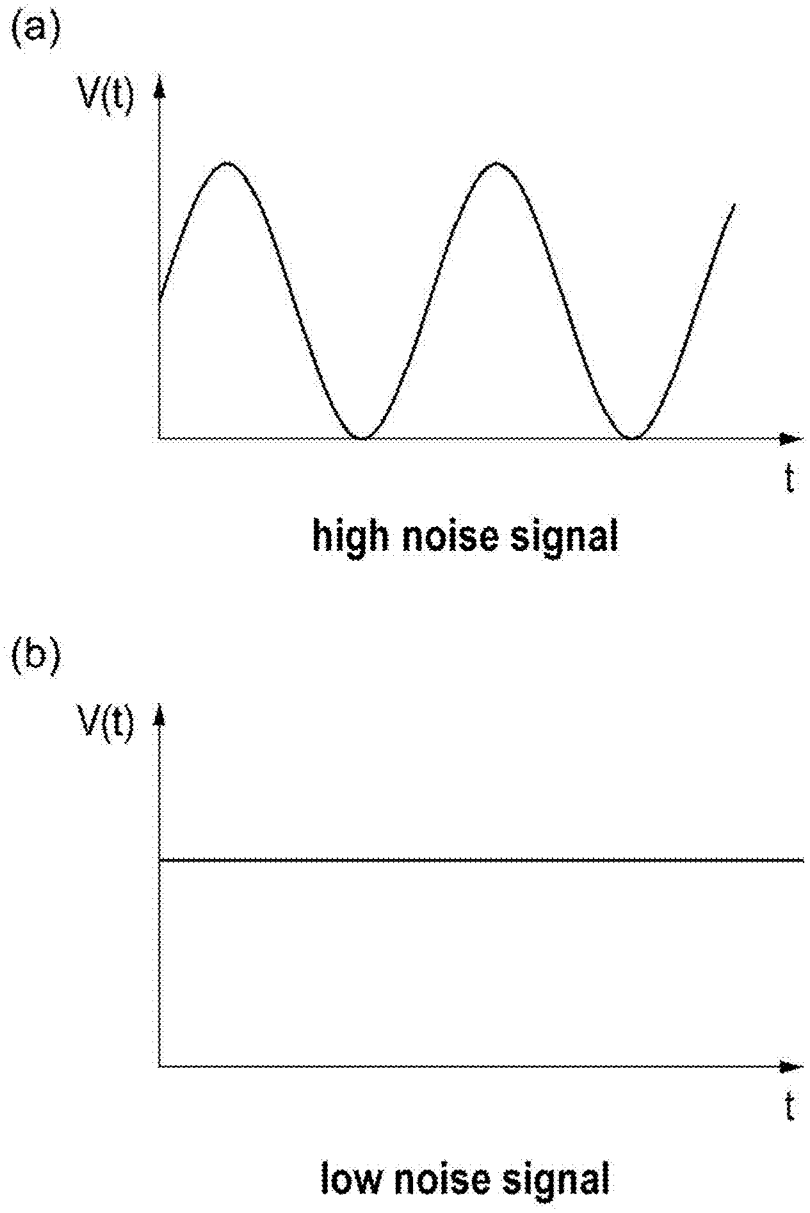
FIG. 9 (PRIOR ART)
Figure 10:
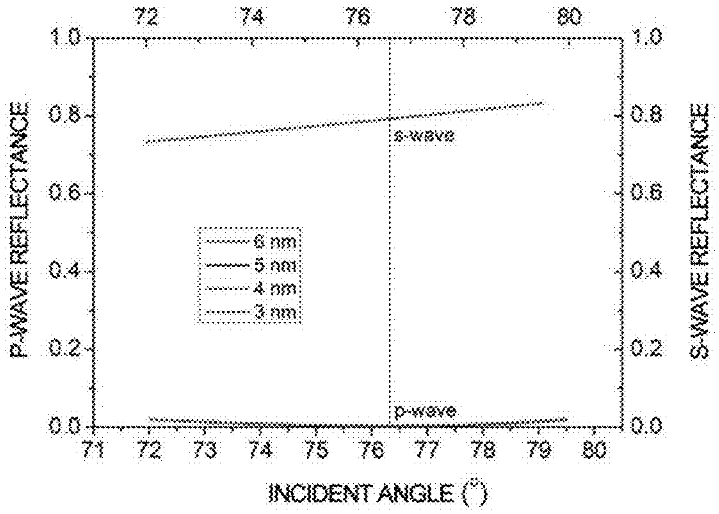
FIG. 10 (PRIOR ART)
FIG. 10 is a graph showing a measurement performed on a sample using the prior art measurement sensor under a p-wave non-reflective condition.
Figure 11:
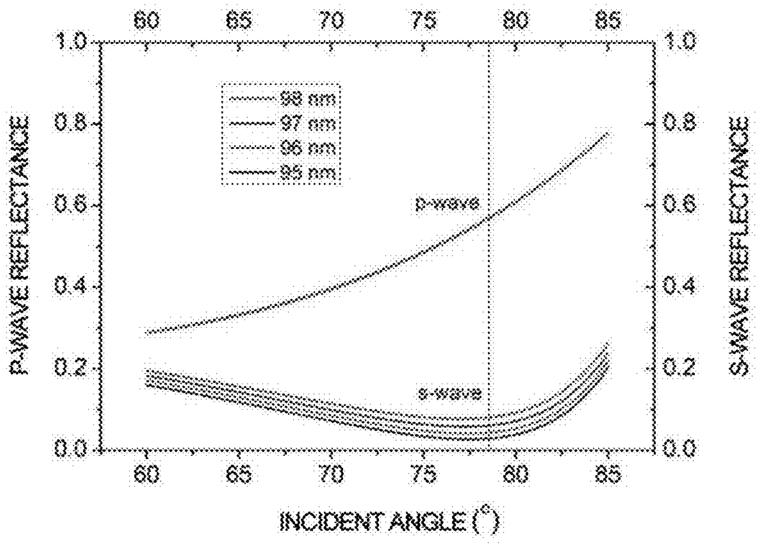
FIG. 11 (PRIOR ART)
FIG. 11 is a graph showing a measurement performed on a sample using the prior art measurement sensor under an s-wave non-reflective condition.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 12:
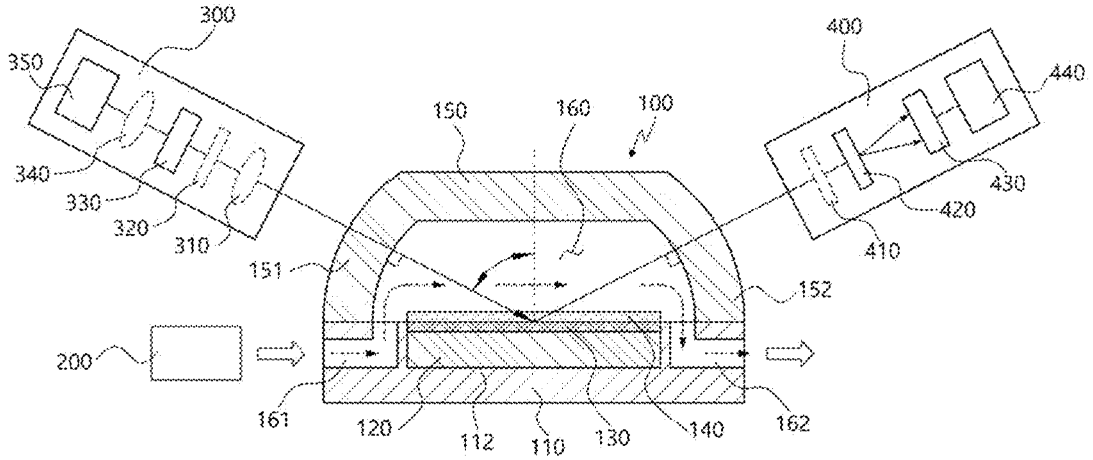
FIG. 12 is a schematic view of an apparatus for an ellipsometric amplitude sensor according to an embodiment of the invention.
Figure 13:
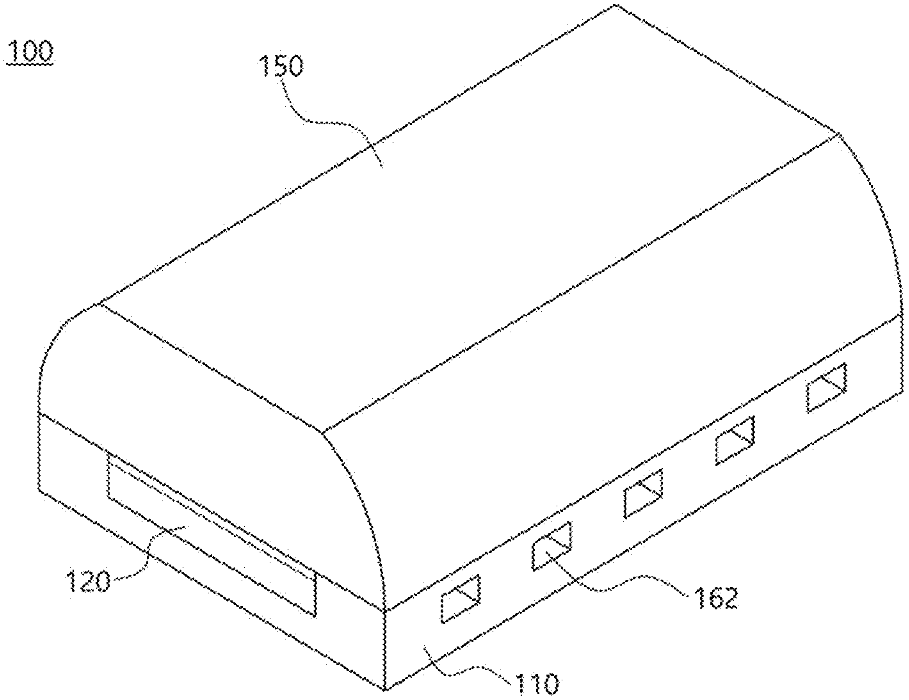
FIG. 13 is a perspective view showing a fine channel structure and a cover according to an embodiment of the invention.
Figure 14:
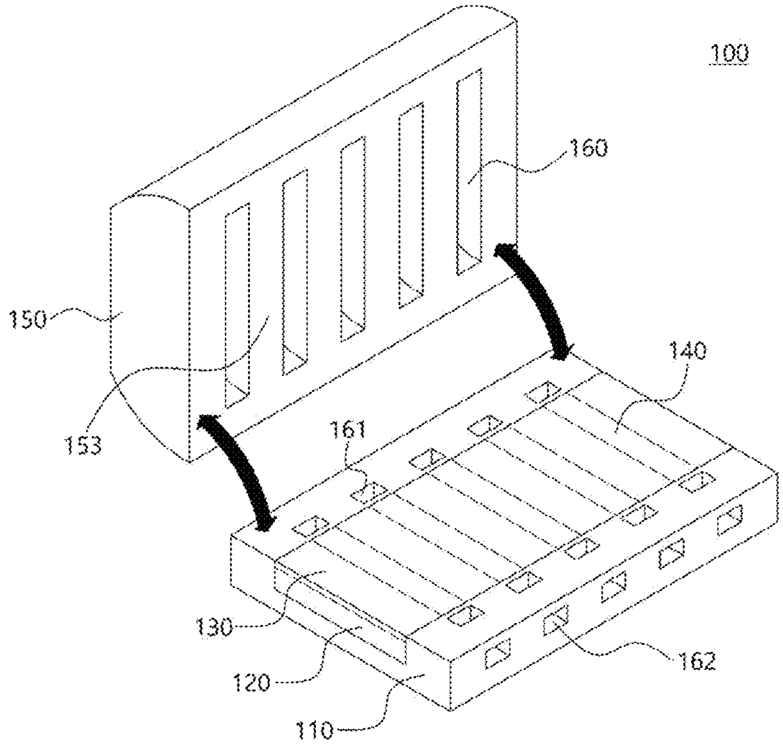
FIG. 14 is a perspective view showing separation of the fine channel structure and the cover according to an embodiment of the invention.
Figure 15:
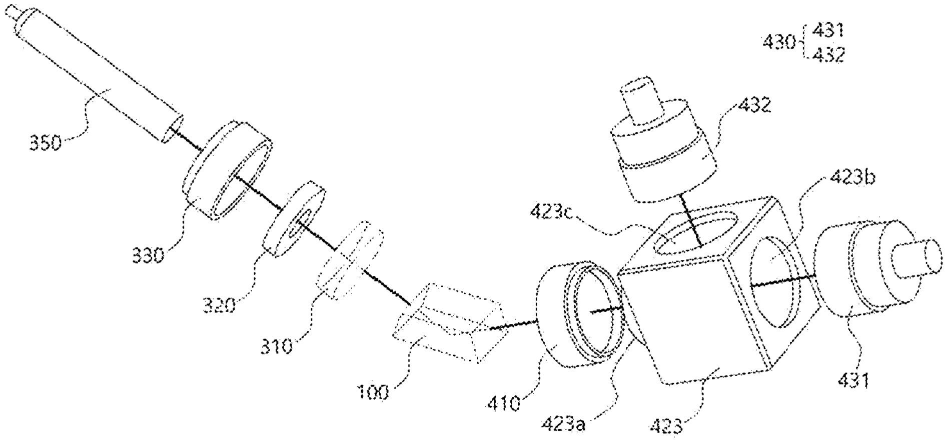
FIG. 15 is an exploded view of an apparatus for an ellipsometric amplitude sensor according to an embodiment of the invention.

FIG. 12 is a schematic view of an apparatus for an ellipsometric amplitude sensor according to an embodiment of the invention, FIG. 13 is a perspective view of a fine channel structure 100 and a cover 150 according to an embodiment of the invention, FIG. 14 is a perspective view showing separation of the fine channel structure 100 and the cover 150 according an embodiment of the invention, and FIG. 15 is an exploded view of an apparatus for an ellipsometric amplitude sensor according to an embodiment of the invention.

As shown in FIGS. 12 to 15, an apparatus for an ellipsometric amplitude sensor according to an embodiment of the invention includes: a fine channel structure 100 including a bed 110, a substrate 120 disposed on the bed 110, a dielectric thin film 130 formed on the substrate 120, a cover 150 having an incident window 151 and a reflective window 152 on one side and the other side, respectively, and installed on the bed 110, and a fine channel 160 that is a channel formed by combination of the cover 150 and the bed 110; a sample injector 200 capable of injecting a buffer containing a biomaterial sample into the fine channel 160 to form an adsorption layer 140 of a sample on the dielectric thin film 130; a polarized light generator 300 emitting incident light polarized through the incident window 151 to the adsorption layer 140 at an incident angle θ satisfying a p-wave or s-wave non-reflective condition; and a polarized light detector 400 detecting an ellipsometric amplitude angle by measuring reflective light, which has passed through the reflective window 152 after reflecting from the adsorption layer 140, separately with reflectance of p-wave and s-wave.

The apparatus for an ellipsometric amplitude sensor according to an embodiment is capable of measuring binding and dissociation kinetics of a biomaterial including low molecules using ellipsometry and reflectometry, and may have a structure in which a buffer containing biomaterial sample (not shown) is injected into the fine channel structure 100 from the sample injector 200.

The bed 110 may have a rectangular plate shape and may have a groove 112 for forming the substrate 120 and the dielectric thin film 130. Further, the bed 110 may have a plurality of inlets 161 at one side of the bed 110 and a plurality of outlets 162 at the other side of the bed 110.

In particular, the inlets and the outlets 162 of the fine channel 160 may be formed at one side and the other side, respectively, with respect to the groove 112, and the groove 112, the inlets 161, and the outlets 162 may be formed by an etching process or an exposing process of a semiconductor.

The substrate 120 may be formed in a rectangular plate shape in the groove 112 of the bed 110 and may be made of any one or more materials selected from silicon, a dielectric, or a semiconductor. The substrate 120 may be made of silicon, which has the advantage of providing uniform and stable properties at a low cost.

Further, when a semiconductor or a dielectric is used as the substrate 120, measurement sensitivity may be increased in comparison to silicon under a p-wave or s-wave non-reflective condition because the difference in refractive index between a semiconductor or a dielectric and biomaterials is large. Further, the substrate 120 may have complex refractive index of about 3.8391+10.018186 at 655 nm.

The dielectric thin film 130 formed on the substrate 120 may be any one of a transparent semiconductor oxide film or glass film. The thickness of the dielectric thin film 520 may be greater than 0 and less than 10 nm. In this case, the dielectric thin film 130 is a semiconductor oxide film or glass film having a thickness that satisfies a p-wave or s-wave non-reflective condition, and may be formed to be transparent.

As an example of the dielectric thin film 130 that can be the most easily obtained, silicon oxide film ($SiO_2$) formed by growing silicon to several nanometers through natural oxidation may be utilized. The refractive index of a silicon oxide film is about 1.456 at 655 nm and is greatly different from the refractive index of the substrate 120 made of silicon, so it can contribute to increasing the measurement sensitivity of the apparatus for an ellipsometric amplitude sensor.

Further, a glass film made of optical glass may be used as the dielectric thin film 130. The dielectric thin film 130 that is made of silicon or a silicon oxide film or a glass film can be manufactured with uniform refractive index in comparison to metal thin films such as gold or silver, so there is the advantage that it is possible to provide a stable optical characteristic and reduce a manufacturing cost.

The cover 150 is installed on the bed 110 and may have an incident window 151 and a reflective window 152 on one side and the other side, respectively. Further, each of the incident window 151 and the reflective window 152 may have a curved shape having a predetermined curvature or a flat plate shape.

In detail, the incident window 151 and the reflective window 152 may be formed in a curved plate shape having a predetermined curvature such that incident light and reflective light can perpendicularly travel into them. Further, the cover 150 has a plurality of separation walls 153 dividing the internal space thereof, so a plurality of fine channels 160 can be formed.

As shown in FIG. 14, a plurality of separation walls 153 for forming micro-scale fine channels 160 may be provided. Only the incident window 151 and the reflective window 152 of the cover 150 may be made of a transmissive material such as glass or a transparent synthetic resin material, however, in some embodiments, the entire cover 150 including the incident window 151, the reflective window 152, and the separation walls 153 may be integrally formed through molding.

Meanwhile, as an example of synthetic resin materials, acrylic resin such as polymethyl methacrylate (PMMA) may be used. Further, a silicon-based material such as polydimethylsiloxane (PDMS) may also be used.

The fine channel 160 is a passage through which a buffer containing a sample flows inside or outside, and may be formed in a plurality. That is, the spaces between the separation walls 153 of the cover 150 are respectively connected to the inlets 161 and the outlets 162 formed at the bed 110, whereby a plurality of fine channels 160 can be formed at the fine channel structure 100. In this case, the width of the fine channel 160 may have a micro scale under 1 mm.

As shown in FIG. 12, the sample injector 200 can inject a buffer containing a sample (not shown) that is a low molecular biomaterial into the inlet 161 of the fine channel 160. The sample injector 200 has a structure for dissolving a sample into a buffer at a predetermined concentration and may have a valve device (not shown) that can allow and prevent injection of a buffer into the fine channel 160.

In this case, the sample injector 200 can inject a buffer into each of the fine channels 160 at different concentrations of the sample or at intervals. Meanwhile, when a buffer is injected to the fine channels 160, a portion of the sample (not shown) is adsorbed on the dielectric thin film 130, thereby forming an adsorption layer 140 with a predetermined thickness.

In this case, the adsorption layer 140 may be a multi-layer film formed of a self-assembled monolayer fitting to the bonding characteristics of various biomaterials, an immobilization material, and various biomaterials including low molecules bonding to the immobilization material.

As a medium that is discharged from the sample injector 200, in addition to using buffer as a medium, gas may be used as a medium of the fine channels 160 to measure a biomarker included in gas. In this case, air can be used as the gas, but the inventive concepts are not limited thereto and gases other than air may be used in some embodiments. In this case, air including a biomarker may be injected into the fine channels 160 from the sample injector 200.

As shown in FIG. 14, the fine channel structure 100 may include a plurality of dielectric thin films 130, and a plurality of different samples may be adsorbed to the plurality of dielectric thin films 130, respectively. Accordingly, a plurality of different adsorption layers 140 may be formed.

In detail, a plurality of dielectric thin films 130 may be separately formed to correspond to a plurality of fine channels 160, respectively, a plurality of different samples may be put into a plurality of inlets 161, respectively, and a plurality of different adsorption layers 140 may be formed while the samples pass through the dielectric thin films 130, respectively.

In this case, a plurality of adsorption layers 140 is formed in one fine channel structure 100, so it is possible to collect optical data of a plurality of samples using one fine channel structure 100, whereby the efficiency of analyzing biomaterials in samples can be improved.

The polarized light generator 300 can serve to emit polarized incident light to the adsorption layer 140 through the incident window 151 of the fine channel structure 100. The polarized light generator 300 may include: a light source 350 that emits predetermined light; an incident polarizer 330 that is a polarizer for producing polarized light; and an incident compensator 320 that delays the phase of a polarization component of incident light.

Further, the polarized light generator 300 may further include: a collimating lens 340 that provides collimated light to the incident polarizer 330; and a focusing lens 310 that increases the light quantity of incident light by converging collimated light that has passed though the polarizer 300.

In this case, the focusing lens 310 may be formed at a position closest to the fine channel structure 100, and the incident compensator 320, the incident polarizer 330, the collimating lens 340, and the light source 350 may be sequentially arranged in a direction away from the fine channel structure 100 after the focusing lens 310.

Polarized incident light has polarization components of a p-wave and an s-wave, and it is possible to send light almost close to a p-wave in order to increase the signal to noise ratio. In this case, incident light may be emitted at an incident angle θ that satisfies a p-wave non-reflective condition.

In an ellipsometric equation, a complex reflection coefficient ratio ρ can be expressed as the ratio of the reflection coefficient $r_p$ of a p-polarized wave to the reflection coefficient rs of an s-polarized wave, that is, $\rho=r_p/r_s$, in which a p-polarized wave non-reflective condition refers to a condition in which the reflection coefficient $r_p$ of a p-polarized wave has a value close to 0 and an s-polarized wave non-reflective condition refers to a condition in which the reflection coefficient rs of an s-polarized wave has a value close to 0. The p-polarized wave non-reflective condition is similar to a surface plasmon resonance condition of an SPR sensor of the related art and is a condition in which measurement sensitivity is the highest.

Incident light generated by the polarized light generator 300 may be a linear-polarized, circular-polarized, elliptical-polarized, or non-polarized light source 350. Further, as the light source 350, a light source 350 having high focusing efficiency such as various lamps emitting monochromic light or white light of the wavebands of infrared light, visible light, or ultraviolet light, a light emitting diode (LED), a semiconductor laser diode (LD) including solid-, liquid-, gas-lasers and a laser diode, and a tungsten filament may be used. Further, the light source 350 may have a structure that can change a wavelength in accordance with the structure of optical systems.

Meanwhile, the magnitude of an optical signal of reflective light may be relatively small around the p-polarized wave non-reflective condition described above, and in this case, it is possible to enable high-sensitivity measurement by increasing a signal to noise ratio by emitting light with a high light quantity using a laser having coherence.

The polarizer 330 has a polarization plate and polarizes light emitted from the light source 350. In this case, a polarization component has a p-wave parallel with an incident surface and an s-wave perpendicular to the incident surface.

The collimating lens 340 can receive light from the light source 350 and provide collimated light to the incident polarizer 330. Further, the focusing lens 310 can increase the light quantity of incident light by converging collimated light that has passed through the incident polarizer 330. Further, the incident compensator 320 can serve to delay the phase of a polarization component of incident light.

Reflective light reflected from the adsorption layer 140 through the reflective window 152 travels into the polarized light detector 400, and the polarized light detector 400 can serve to detect variation of a polarization state of incident light.

The polarized light detector 400 may include a polarizing beamsplitter 420 that splits reflective light into two pieces of polarized light and a light detection unit 430 that obtains predetermined optical data by detecting two pieces of light.

Further, the polarized light detector 400 may further include: an operation processor 440 that is electrically connected to the light detection unit 430 and derives measurement values based on optical data; and a detection compensator 410 that delays the phase of a polarization component of reflective light.

In this case, the detection compensator 410 may be formed at a position closest to the fine channel structure 100, and the polarizing beamsplitter 420, the light detection unit 430, and the operation processor 440 may be sequentially arranged in a direction away from the fine channel structure 100 after the detection compensator 410.

The polarizing beamsplitter 420 can split reflective light into two pieces of light and simultaneously make the two pieces of separate light be polarized. The structure of the polarizing beamsplitter 420 will be described in detail below.

As described above, two pieces of polarized light are produced by the polarizing beamsplitter 420, and the light detection unit 430 may include a p-wave detector 431 that detects p-wave light from two pieces of light and an s-wave detector 432 that detects s-wave light from two pieces of light.

In this case, the p-wave detector 431 may include any one of a CCD-type solid state imaging device, a photomultiplier tube, and a silicon photodiode. Further, the s-wave detector 432 may include any one of a CCD-type solid state imaging device, a photomultiplier tube, and a silicon photodiode.

Each of the p-wave detector 431 and the s-wave detector 432 can serve to obtain optical data by detecting incident light and convert the optical data into an electric signal. The optical data obtained by the detectors may include information about variation of the polarization state of two pieces of light.

The operation processor 440 can derive measurement values including the adsorption concentration, and adsorption and dissociation constants of a sample by obtaining an amplitude ellipsometric constant Ψ of ellipsometry by measuring only the reflectance ratio of p-wave light and s-wave light that are two pieces of light split from reflective light.

In detail, the operation processor 440 can derive a measurement value by receiving electric signal from the light detection unit 430. A predetermined analysis program using reflectometry and ellipsometry is stored in the operation processor 440. The operation processor 440 extracts and analyzes optical data converted into an electric signal, thereby deriving measurement values, such as the adsorption concentration of a sample, the thickness of the adsorption layer 140, an adsorption constant, a dissociation constant, and a refractive index.

In this case, it is preferable that the operation processor 440 derives a measurement value by obtaining an amplitude ellipsometric constant Ψ relating to an amplitude of ellipsometry to improve measurement sensitivity. In this case, the amplitude ellipsometric constant Ψ can be derived from the following [Equation].

$$(\tan \Psi)^2 = Rp/Rs \qquad \text{[Equation]}$$

Here, Ψ denotes an amplitude ellipsometric constant, Rp denotes reflectance of p-wave light detected by the p-wave detector 431 from two pieces of light split from reflective light, and Rs denotes reflectance of s-wave light detected by the s-wave detector 432 split from reflective light.

Figure 16:
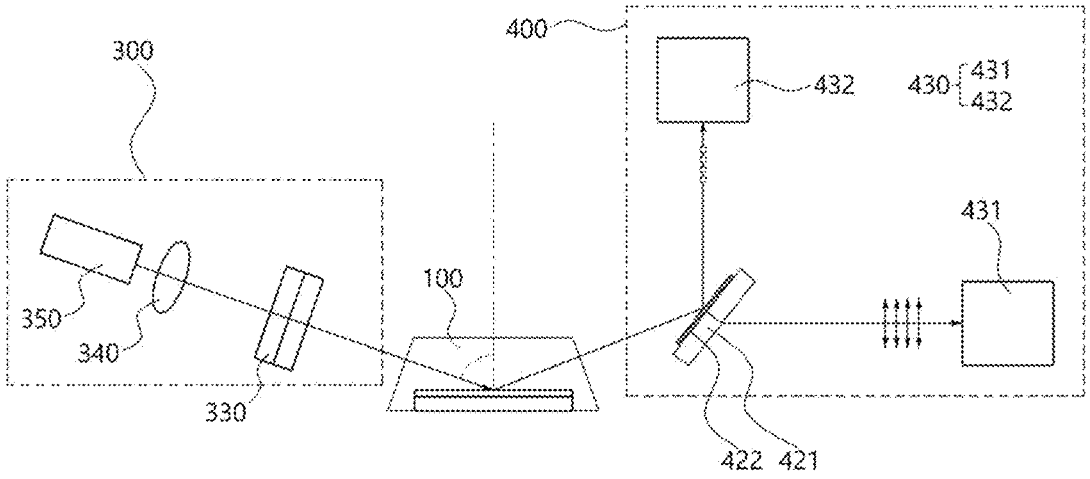
FIG. 16 is a schematic view of an apparatus for an ellipsometric amplitude sensor according to a first embodiment.
Figure 17:
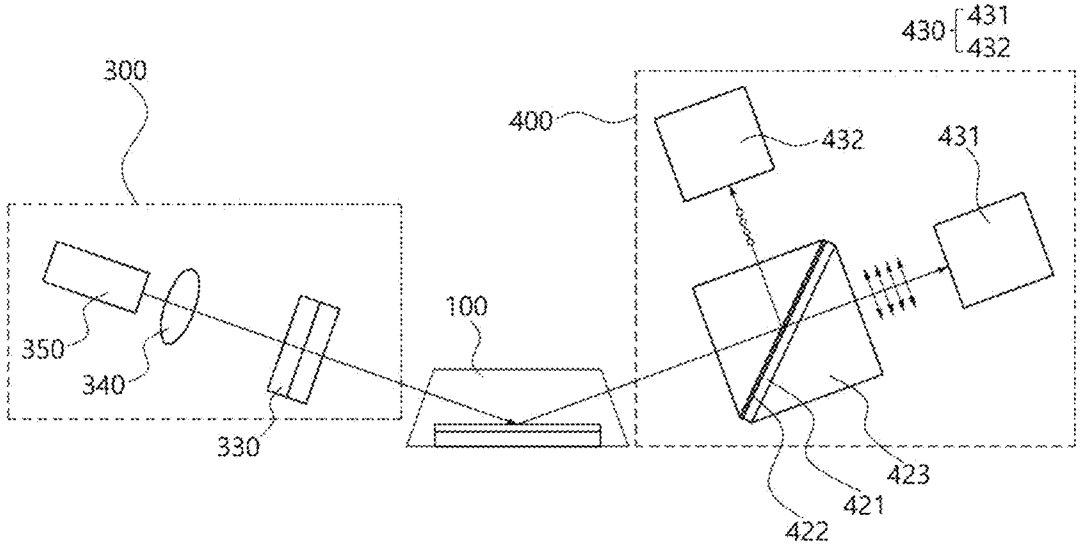
FIG. 17 is a schematic view of an apparatus for an ellipsometric amplitude sensor according to a second embodiment.
Figure 18:
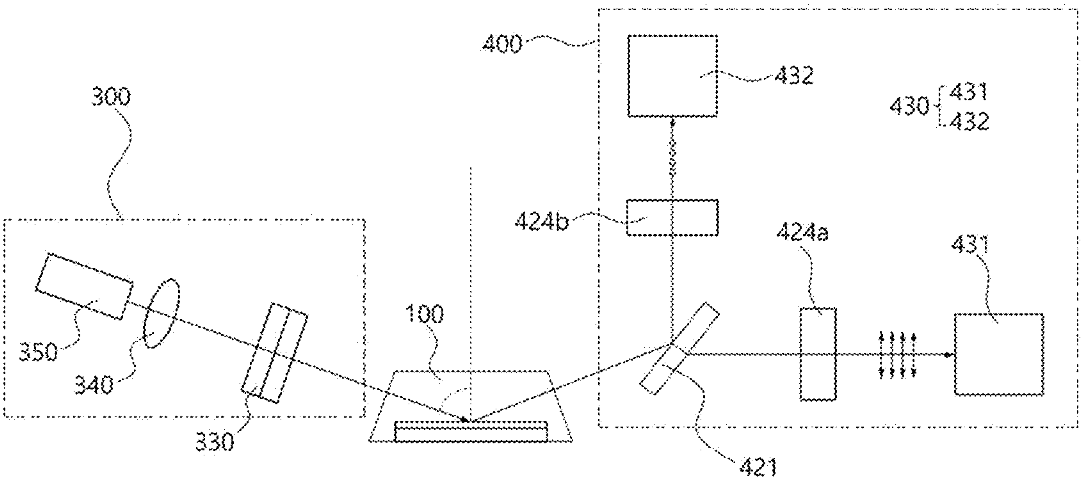
FIG. 18 is a schematic view of an apparatus for an ellipsometric amplitude sensor according to a third embodiment.

FIG. 16 is a schematic view of an apparatus for an ellipsometric amplitude sensor according to a first embodiment, FIG. 17 is a schematic view of an apparatus for an ellipsometric amplitude sensor according to a second embodiment, and FIG. 18 is a schematic view of an apparatus for an ellipsometric amplitude sensor according to a third embodiment.

Components are schematically shown in FIGS. 16 to 18. In some embodiments, the cover 150 may be omitted in the apparatus for an ellipsometric amplitude sensor illustrated in FIGS. 16 to 18.

In particular, in FIGS. 16 to 18, the polarizing beamsplitter is schematically illustrated, and other components constituting the polarizing beamsplitter are not illustrated for convenience of description.

As shown in FIG. 16, the polarizing beamsplitter may be a polarizing plate beamsplitter. In detail, the polarizing beamsplitter may include a beamsplitter 421 that splits reflective light into two pieces of light, and a coating layer 422 that is formed on the surface of the beamsplitter 421 by coating and polarizes reflective light.

In this case, the incident polarizer 330 and the incident compensator 320 shown in FIG. 12 can be rotated at a specific angle to form linear polarized light, circular-polarized light, or elliptical-polarized light, and may form non-polarized incident light. The polarized light generator can form an incident angle that satisfies p-wave and s-wave non-reflective conditions according to the thickness of a silicon oxide film.

As shown in FIG. 17, the polarizing beamsplitter may be a polarizing beamsplitter cube. In detail, the polarizing beamsplitter may include a beamsplitter 421 that splits reflective light into two pieces of light; a coating layer 422 that is formed on the surface of the beamsplitter 421 by coating and polarizes reflective light, and a cube 423 formed by putting the combination of the coating layer 422 and the beamsplitter 421 therein.

Referring back to FIG. 15 showing an apparatus for an ellipsometric amplitude sensor, the cube 423 is formed in a box shape and may have an incident hole 423*a* through which reflective light travels inside. An s-wave light, which is one of two pieces of light polarized and split by the beamsplitter 421 and the coating layer 422, may pass through an s-wave hole 423*c*. A p-wave light that is the other light may pass through a p-wave hole 423*b*.

In this case, the incident polarizer 330 can be rotated at a specific angle, and the incident compensator 320 can also be rotated at a specific angle.

In the embodiments shown in FIGS. 16 and 17, reflective light is polarized first through the coating layer 422, and the polarized reflective light is split into two pieces of light through the beamsplitter 421, whereby one piece of light can be transmitted to the s-wave detector 432 and the other one can be transmitted to the p-wave detector 431.

As shown in FIG. 18, the polarizing beamsplitter may include a beamsplitter 421 that splits reflective light into two pieces of light; a first splitting polarizer 424*a* that is a polarizer polarizing one of two pieces of light; and a second splitting polarizer 424*b* that is a polarizer polarizing the other one of two pieces of light.

In detail, reflective light is split into two pieces of light through the beamsplitter 421, and one of the two pieces of light is polarized through the first splitting polarizer 424*a*, whereby p-wave light can be transmitted to the p-wave detector 431. Further, the other one of the two pieces of light is polarized through the second splitting polarizer 424*b* and *s*-wave light can be transmitted to the s-wave detector 432.

In this manner, reflective light is split into p-wave light and s-wave light by the polarized light detector 400 and the two pieces of light are detected by the p-wave detector 431 and the s-wave detector 432, respectively, whereby the reflectance of the p-wave light and the reflectance of the s-wave light are immediately derived. Further, it is possible to derive an amplitude ellipsometric constant Ψ through the above [Equation] using the ratio of the reflectance of the p-wave light and the reflectance of the s-wave light.

Accordingly, it is possible to measure high-sensitive ellipsometric amplitude simply by measuring only reflectance of p-wave and s-wave without using a rotating analyzer or a polarization modulator that requires a complicated actuator. Further, it is possible to measure signals of a p-wave and an s-wave with high sensitivity in predetermined signal bands of light detector using the light detectors, respectively.

Further, the apparatus for an ellipsometric amplitude sensor according to embodiment may obviate the need for rotating the polarizing beamsplitter 420 or the polarizer of the polarized light detector 400, so it is possible to use the apparatus for an ellipsometric amplitude sensor as an apparatus for high-sensitivity site diagnosis sensor by measuring only reflectance without an actuator for rotation or polarization modulation of a polarizer.

Hereafter, a method performed in an apparatus for an ellipsometric amplitude sensor according to an embodiment will be described.

First, in a first step, the sample injector 200 can inject a buffer containing a sample into the fine channel 160 of the fine channel structure 100. In the first step, a plurality of buffers containing samples at different concentrations may be injected into a plurality of fine channels 160.

In this case, the sample injector 200 can inject buffers containing samples at different concentrations into multiple fine channels 160, respectively. Further, it is possible to inject buffers into the fine channels 160 at predetermined time intervals, respectively. Further, it is possible to inject buffers into only some fine channels 160 without using other fine channels 160.

Further, in a second step, the sample flows into the fine channel 160 and is adsorbed to the dielectric thin film 130, whereby an adsorption layer 140 can be formed. In the second step, a plurality of different sample materials may be respectively adsorbed to a plurality of dielectric thin films 130 disposed in a plurality of fine channels 160, respectively.

Next, in a third step, the polarized light generator 300 can polarize predetermined light and send the polarized light into the adsorption layer 140 at an incident angle satisfying a p-wave or s-wave non-reflective condition through the incident window 151 of the fine channel structure 100. In this case, the polarized incident light has polarization components of a p-wave and an s-wave. Meanwhile, the incident light may have an incident angle θ satisfying the p-wave non-reflective condition.

Further, in a fourth step, reflective light reflected from the adsorption layer 140 can travel into the polarized light detector 400 through the reflective window 152. Thereafter, in a fifth step, the polarized light detector 400 can measure only the reflectance ratio of the p-wave and the s-wave of the reflective light and can calculate an amplitude ellipsometric constant Ψ of ellipsometry using the reflectance ratio of the p-wave and the s-wave.

In this case, the fifth step may include: a step 5-1 of polarizing reflective light into p-wave and an s-wave by utilizing the polarizing beamsplitter 420; a step 5-2 of obtaining predetermined optical data by detecting polarized reflective light by utilizing the light detection unit 430; and a step 5-3 of deriving measurement values including the adsorption concentration and adsorption and dissociation constants of a sample by obtaining an amplitude ellipsometric constant Ψ for an amplitude of ellipsometry using the reflectance ratio of the p-wave and the s-wave.

Other details of the method performed in an ellipsometric amplitude sensor according to an embodiment are the same as those described above in relation to the apparatus for an ellipsometric amplitude sensor.

Figure 19:
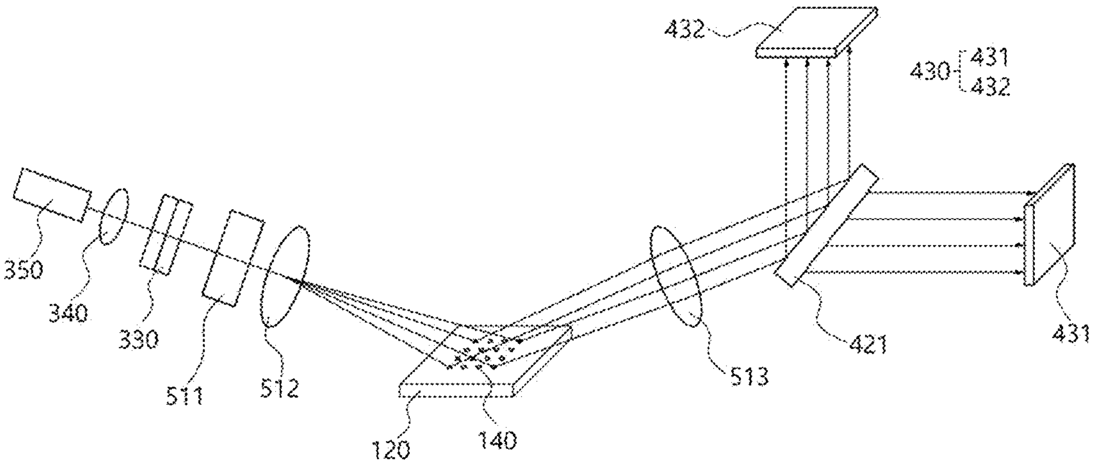
FIG. 19 is a schematic view of an apparatus for an ellipsometric amplitude sensor according to a fourth embodiment.

FIG. 19 is a schematic view of an apparatus for an ellipsometric amplitude sensor according to a fourth embodiment. In FIG. 19, the cover 150 is not shown for convenience of description.

As shown in FIG. 19, an apparatus for an ellipsometric amplitude sensor according to a fourth embodiment includes: a fine channel structure including a bed, a substrate 120 disposed on the bed, a dielectric thin film formed on the substrate 120, a cover (not shown) having an incident window and a reflective window on one side and the other side, respectively, and installed on the bed, and a fine channel that is a channel formed by combination of the cover and the bed; a sample injector forming an adsorption layer 140 of a sample on the dielectric thin film by injecting a buffer containing a biomaterial sample into the fine channel; a polarized light generator emitting incident light polarized through the incident window to the adsorption layer 140 at an incident angle θ satisfying a p-wave or s-wave non-reflective condition; and a polarized light detector detecting an ellipsometric amplitude angle by measuring reflective light, which has passed through the reflective window after reflecting from the adsorption layer 140, separately with reflectance of p-wave and s-wave. The configurations of the fine channel structure, the bed, the dielectric thin film, the cover, the incident window, the reflective window, the sample injector are substantially the same as those illustrated with reference to FIG. 12, and thus, repeated descriptions thereof will be omitted to avoid redundancy.

Further, a plurality of adsorption layers 140 is formed in one fine channel, and the polarized light generator can emit a plurality of pieces of light to the plurality of adsorption layers 140, respectively. In detail, a plurality of dielectric thin films may be formed in one fine channel and arranged in the flow direction of a sample.

In the apparatus for an ellipsometric amplitude sensor according to the fourth embodiment, the polarized light generator may include: a light source 350 that emits predetermined light; an incident polarizer 330 that is a polarizer for producing polarized light; a collimating lens 340 that provides collimated light to the incident polarizer 330; a beamsplitter DOE 511 that splits light that has passed through the incident polarizer 330 into a plurality of pieces of incident light; and a focusing lens 512 that distributes a plurality of pieces of incident light to the plurality of adsorption layers 140.

In this case, the focusing lens 512 may be formed at a position closest to the fine channel structure 100, and the beamsplitter DOE 511, the incident polarizer 330, the collimating lens 340, and the light source 350 may be sequentially arranged in a direction away from the fine channel structure 100 after the focusing lens 512.

Further, the polarized light detector may include a light detection unit 430 that obtains predetermined optical data by detecting a plurality of pieces of reflective light by a plurality of pieces of incident light. Further, the polarized light detector may include: a parallel control lens 513 that makes a plurality of pieces of reflective light travel parallel with each other by transmitting the plurality of pieces of reflective light; and an operation processor that is electrically connected to the light detection unit 430 and derives measurement values based on optical data.

In this case, the parallel control lens 513 may be a concave lens, and the light detection unit 430 may include a p-wave detector 431 that detects p-wave light from two pieces of light and an s-wave detector 432 that detects s-wave light from two pieces of light.

As described above, since a plurality of pieces of reflective light are formed, a plurality of pieces of p-wave light by a plurality of pieces of reflective light can be transmitted and detected at the p-wave detector 431 and a plurality of pieces of s-wave light by a plurality of pieces of reflective light can be transmitted and detected at the s-wave detector 432.

To this end, a plurality of p-wave detection elements for detecting a plurality of pieces of p-wave light may be formed at the p-wave detector 431, and one piece of p-wave light of a plurality of pieces of p-wave light can be emitted to one detection element of the plurality of p-wave detection elements.

Further, a plurality of s-wave detection elements for detecting a plurality of pieces of s-wave light may be formed at the s-wave detector 432, and one piece of s-wave light of a plurality of pieces of s-wave light can be emitted to one detection element of the plurality of s-wave detection elements.

In this case, the p-wave detection element may include any one of a CCD-type solid state imaging device, a photomultiplier tube, and a silicon photodiode. Further, the s-wave detection element may include any one of a CCD-type solid state imaging device, a photomultiplier tube, and a silicon photodiode.

The operation processor collects data about the reflectance of a plurality of pieces of p-wave light using optical data obtained by the plurality of p-wave detection elements and calculates the average of the reflectance of the plurality of pieces of p-wave light, thereby being able to derive a p-wave light reflectance value for calculating an amplitude ellipsometric constant Ψ of ellipsometry.

Similarly, the operation processor collects data about the reflectance of a plurality of pieces of s-wave light using optical data obtained by the plurality of s-wave detection elements and calculates the average of the reflectance of the plurality of pieces of s-wave light, thereby being able to derive a s-wave light reflectance value for calculating an amplitude ellipsometric constant Ψ of ellipsometry.

As described above, since the operation processor calculates the amplitude ellipsometric constant Ψ using the average of the reflectance of the plurality of pieces of p-wave light and the average of the reflectance of the plurality of pieces of s-wave light, the errors in the p-wave light reflectance and the s-wave light reflectance are reduced, whereby an error in the amplitude ellipsometric constant Ψ is reduced and it is possible to improve the accuracy in analysis of a sample.

The details of the other components excluding the components which are included in the apparatus for an ellipsometric amplitude sensor according to the fourth embodiment and are different from the components of the apparatus for an ellipsometric amplitude sensor according to the first embodiment, such as the plurality of dielectric thin films 130, the light detection unit 430, etc. described above, are the same as the description of the apparatus for an ellipsometric amplitude sensor according to the first embodiment.

Figure 20:
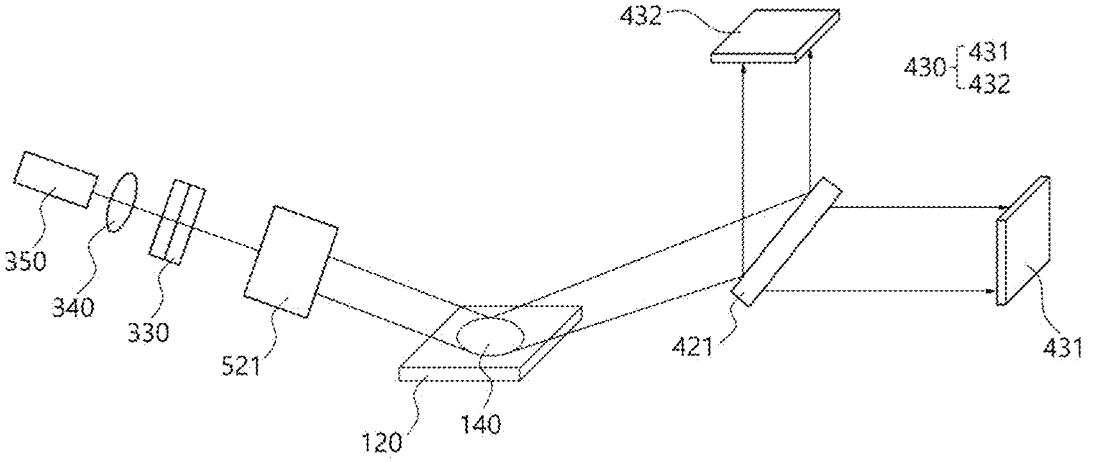
FIG. 20 is a schematic view of an apparatus for an ellipsometric amplitude sensor according to a fifth embodiment.

FIG. 20 is a schematic view of an apparatus for an ellipsometric amplitude sensor according to a fifth embodiment. In FIG. 20, the cover 150 is not illustrated for convenience of description.

As shown in FIG. 20, an apparatus for an ellipsometric amplitude sensor according to the fifth embodiment includes: a fine channel structure including a bed, a substrate 120 disposed on the bed, a dielectric thin film formed on the substrate 120, a cover having an incident window and a reflective window on one side and the other side, respectively, and installed on the bed, and a fine channel that is a channel formed by combination of the cover and the bed; a sample injector forming an adsorption layer 140 of a sample on the dielectric thin film by injecting a buffer containing a biomaterial sample into the fine channel; a polarized light generator emitting incident light polarized through the incident window to the adsorption layer 140 at an incident angle θ satisfying a p-wave or s-wave non-reflective condition; and a polarized light detector detecting an ellipsometric amplitude angle by measuring reflective light, which has passed through the reflective window after reflecting from the adsorption layer 140, separately with reflectance of p-wave and s-wave. The configurations of the fine channel structure, the bed, the dielectric thin film, the cover, the incident window, the reflective window, the sample injector are substantially the same as those illustrated with reference to FIG. 12, and thus, repeated descriptions thereof will be omitted to avoid redundancy.

In this case, the polarized light generator may include a beam expander 521 that expands the emission area of incident light. Further, the polarized light generator may include: a light source 350 that emits predetermined light; a collimating lens 340 that provides collimated light to the incident polarizer 330; an incident polarizer 330 that is a polarizer for producing polarized light.

As shown in FIG. 20, the area of incident light is increased by the beam expander 521, so incident light can travel into the dielectric thin film, and light having an increased area can be transmitted to the polarized light detector.

In this case, the area of the dielectric thin film may be increased in correspondence to the area of incident light, and the internal volume of the fine channel may also be correspondingly increased, and accordingly, it is possible to analyze a sample by passing a large amount of buffer through the fine channel or passing a buffer of a sample containing a biomaterial with relatively large particles through the fine channel.

The details of the other components excluding the components which are included in the apparatus for an ellipsometric amplitude sensor according to the fifth embodiment and are different from the components of the apparatus for an ellipsometric amplitude sensor according to the first embodiment, such as the dielectric thin film having an increased area, the polarized light generator, etc. described above, are the same as the description of the apparatus for an ellipsometric amplitude sensor according to the first embodiment.

According to embodiments, a semiconductor oxide film ellipsometric amplitude sensor is capable of simply measuring an ellipsometric amplitude with high sensitivity by utilizing a semiconductor oxide film that satisfies p-wave and s-wave non-reflective conditions and measuring only reflectance of p-wave and s-wave without using a rotating analyzer or a polarization modulator that requires a complicated actuator.

Further, even though the existing measurement method had a problem that a large measurement error may be generated because it is difficult for a light detector to maintain linearity from a very low signal to a very high signal band due to the ellipsometric principle of performing measurement through a same light detector while rotating a polarizer because the reflectance of a p-wave is very low and the reflectance of an s-wave is very high under a p-wave non-reflective condition, it is possible to measure p-wave and s-wave signals with high sensitivity in predetermined signal bands of light detectors through the light detectors, respectively.

In particular, the existing measurement method may have a problem that a large measurement error due to a polarizer angle is observed even by fine variation such as vibration or optical axis alignment at a small polarizer angle because a polarizer angle of 5 degree or less is used, but it is possible to perform stable measurement without an error due to variation of a polarizer angle at a sufficiently large polarizer angle by measuring the reflectance of a p-wave and an s-wave through different light detectors by applying a semiconductor oxide film ellipsometric amplitude sensor.

Further, the an apparatus for a semiconductor oxide film ellipsometric amplitude sensor according to embodiments is a small and simple sensor device that is used for site diagnosis, and although the existing measurement methods required to use complicated actuators such as polarization modulation by rotating a polarizer, an analyzer, a compensator, etc. or using a piezobirefringence element in order to measure ellipsometric angles Ψ and Δ, thereby being limited in use as a simple site diagnosis device, the apparatus for an ellipsometric amplitude sensor of the present disclosure can be used as an apparatus for a high-sensitive site diagnosis sensor by measuring only reflectance without an actuator for rotation of a polarizer or polarization modulation by applying.

Further, when using the apparatus for an ellipsometric amplitude sensor according to embodiments, it is possible to measure bio-binding materials in a non-labeling manner under an environment of a solution-immersed fine channel, thus it is possible to be widely used in industries such as biochemistry, medicine, food, environment, etc.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

The invention claimed is:

1. An apparatus for a semiconductor oxide film ellipsometric amplitude sensor, comprising:

- a fine channel structure including a bed, a substrate disposed on the bed, a dielectric thin film formed on the substrate, a cover having an incident window and a reflective window on one side and the other side, respectively, and installed on the bed, and a fine channel formed by combination of the cover and the bed;
- a sample injector configured to form an adsorption layer of a sample on the dielectric thin film by injecting a buffer containing a biomaterial sample into the fine channel;
- a polarized light generator configured to emit incident light polarized through the incident window to the adsorption layer at an incident angle θ satisfying a p-wave or s-wave non-reflective condition; and
- a polarized light detector configured to detect an ellipsometric amplitude angle by measuring reflective light, which has passed through the reflective window after being reflected from the adsorption layer, separately with reflectance of p-wave and s-wave,
- wherein the polarized light detector includes a polarizing beamsplitter that splits the reflective light into two pieces of polarized light and a light detection unit that obtains predetermined optical data by detecting the two pieces of light.

2. The apparatus of claim 1, wherein the polarized light detector further includes:

- an operation processor that is electrically connected to the light detection unit and configured to derive measurement values based on the optical data; and
- a detection compensator configured to delay the phase of a polarization component of the reflective light.

3. The apparatus of claim 2, wherein the operation processor is configured to derive the measurement value including an adsorption concentration and adsorption and dissociation constants of the sample by obtaining an amplitude ellipsometric constant Ψ of ellipsometry by measuring only reflectance ratio of p-wave light and s-wave light that are the two pieces of light split from the reflective light.

4. The apparatus of claim 1, wherein the light detection unit includes:

- a p-wave detector configured to detect p-wave light from the two pieces of light; and
- an s-wave detector configured to detect s-wave light from the two pieces of light.

5. The apparatus of claim 1, wherein the polarizing beamsplitter includes:

- a beamsplitter configured to split reflective light into two pieces of light; and
- a coating layer disposed on the surface of the beamsplitter by coating and configured to polarize reflective light.

6. The apparatus of claim 5, wherein the polarizing beamsplitter further includes a cube formed by putting a combination of the coating layer and the beamsplitter therein.

7. The apparatus of claim 1, wherein the polarizing beamsplitter includes:

- a beamsplitter configured to split the reflective light into two pieces of light;
- a first splitting polarizer configured to polarize one of the two pieces of light; and
- a second splitting polarizer configured to polarize the other one of the two pieces of light.

8. The apparatus of claim 1, wherein the polarized light generator includes:

- a light source configured to emit predetermined light;
- an incident polarizer configured to polarize light; and
- an incident compensator configured to delay a phase of a polarization component of the incident light.

9. The apparatus of claim 8, wherein the polarized light generator further includes:

- a collimating lens configured to provide collimated light to the incident polarizer; and
- a focusing lens configured to increase a light quantity of the incident light by converging collimated light that has passed though the polarizer.

10. The apparatus of claim 1, wherein the incident light generated by the polarized light generator is a linear-polarized, circular-polarized, elliptical-polarized, or non-polarized light source.

11. The apparatus of claim 1, wherein the cover has a plurality of separation walls dividing an internal space thereof, whereby a plurality of fine channels is formed.

12. The apparatus of claim 11, wherein the fine channel structure includes a plurality of dielectric thin films and a plurality of different samples is adsorbed to the plurality of dielectric thin films, respectively.

13. A method using the apparatus for a semiconductor oxide film ellipsometric amplitude sensor of claim 1, the method comprising:

- a first step in which the sample injector injects a buffer containing the sample into the fine channel of the fine channel structure;
- a second step in which the sample flows into the fine channel and is adsorbed to the dielectric thin film, thereby forming the adsorption layer;
- a third step in which the polarized light generator polarizes predetermined light and sends the polarized light into the adsorption layer at an incident angle satisfying a p-wave or s-wave non-reflective condition through the incident window of the fine channel structure;
- a fourth step in which reflective light reflected from the adsorption layer travels into the polarized light detector through the reflective window; and
- a fifth step in which the polarized light detector measures only a reflectance ratio of the p-wave and the s-wave of the reflective light and calculates an amplitude ellipsometric constant of ellipsometry using the reflectance ratio of the p-wave and the s-wave.

14. An apparatus for a semiconductor oxide film ellipsometric amplitude sensor, comprising:

- a fine channel structure including a bed, a substrate formed on the bed, a dielectric thin film formed on the substrate, a cover having an incident window and a reflective window on one side and the other side, respectively, and installed on the bed, and a fine channel formed by combination of the cover and the bed;

a sample injector configured to form an adsorption layer of a sample on the dielectric thin film by injecting a buffer containing a biomaterial sample into the fine channel;

a polarized light generator configured to emit incident light polarized through the incident window to the adsorption layer at an incident angle θ satisfying a p-wave or s-wave non-reflective condition; and a polarized light detector configured to detect an ellipsometric amplitude angle by measuring reflective light, which has passed through the reflective window after reflecting from the adsorption layer, separately with reflectance of p-wave and s-wave, wherein a plurality of adsorption layers is formed in one fine channel, wherein the polarized light generator is configured to emit a plurality of pieces of incident light to the plurality of adsorption layers, respectively, and wherein the polarized light detector includes a light detection unit that obtains predetermined optical data by detecting a plurality of pieces of reflective light by the plurality of pieces of incident light.

15. An apparatus for a semiconductor oxide film ellipsometric amplitude sensor, comprising:

a fine channel structure including a bed, a substrate formed on the bed, a dielectric thin film formed on the substrate, a cover having an incident window and a reflective window on one side and the other side, respectively, and installed on the bed, and a fine channel that is a channel formed by combination of the cover and the bed;

a sample injector configured to form an adsorption layer of a sample on the dielectric thin film by injecting a buffer containing a biomaterial sample into the fine channel;

a polarized light generator configured to emit incident light polarized through the incident window to the adsorption layer at an incident angle θ satisfying a p-wave or s-wave non-reflective condition; and a polarized light detector configured to detect an ellipsometric amplitude angle by measuring reflective light, which has passed through the reflective window after reflecting from the adsorption layer, separately with reflectance of p-wave and s-wave, wherein the polarized light detector includes a polarizing beamsplitter configured to split the reflective light into two pieces of polarized light and a light detection unit configured to obtain predetermined optical data by detecting the two pieces of light, and wherein the polarized light generator includes a beam expander configured to expand an emission area of the incident light.

* * * * *